(12) United States Patent
Voronov et al.

(10) Patent No.: US 9,430,685 B2
(45) Date of Patent: Aug. 30, 2016

(54) SUBSTRATE MARKINGS

(71) Applicant: Intel Corporation, Santa Clara, CA (US)

(72) Inventors: Sergei Voronov, Chandler, AZ (US); Rose Mulligan, Chandler, AZ (US); Sarita Evans, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 14/082,969

(22) Filed: Nov. 18, 2013

(65) Prior Publication Data

US 2014/0076976 A1    Mar. 20, 2014

Related U.S. Application Data

(62) Division of application No. 11/618,668, filed on Dec. 29, 2006, now abandoned.

(51) Int. Cl.
| | |
|---|---|
| *G06K 1/12* | (2006.01) |
| *G06K 7/10* | (2006.01) |
| *B41J 2/44* | (2006.01) |
| *B41M 5/24* | (2006.01) |

(52) U.S. Cl.
CPC ......... *G06K 7/10544* (2013.01); *B23K 26/082* (2015.10); *B41J 2/442* (2013.01); *B41M 5/24* (2013.01); *G06K 1/12* (2013.01); *G06K 7/1092* (2013.01)

(58) Field of Classification Search
CPC ... G06K 1/12; G06K 7/10544; G06K 7/1092
USPC ...... 235/462.41, 435, 462.01; 264/400, 488; 425/174.4; 427/58; 438/106, 800
See application file for complete search history.

(56) References Cited

U.S. PATENT DOCUMENTS

| | | | |
|---|---|---|---|
| 5,614,698 | A | 3/1997 | Estes |
| 6,211,935 | B1 * | 4/2001 | Yamada ................ H01L 23/544 257/E23.179 |
| 6,420,792 | B1 | 7/2002 | Guldi et al. |
| 6,460,770 | B1 | 10/2002 | Kacharczyk |
| 6,482,661 | B1 | 11/2002 | Madoyski |
| 6,528,330 | B2 | 3/2003 | Iketani |
| 6,838,299 | B2 | 1/2005 | Mulligan et al. |
| 7,042,065 | B2 | 5/2006 | Seto et al. |

(Continued)

FOREIGN PATENT DOCUMENTS

| | | |
|---|---|---|
| JP | 57122544 | 7/1982 |
| JP | 03044043 A | 2/1991 |

(Continued)

OTHER PUBLICATIONS

"U.S. Appl. No. 11/618,668 Non-Final Office Action mailed Oct. 6, 2010", 5.

(Continued)

*Primary Examiner* — Samuel M Heinrich
(74) *Attorney, Agent, or Firm* — Schwegman Lundberg & Woessner, P.A.

(57) ABSTRACT

Apparatus, systems, and methods are provided to generate markings on the side of a substrate. The markings represent information. In an embodiment, the information provided in the markings may be used to collect information during an assembly process.

19 Claims, 5 Drawing Sheets

(56) References Cited

U.S. PATENT DOCUMENTS

| | | |
|---|---|---|
| 7,169,687 B2 | 1/2007 | Li et al. |
| 7,179,720 B2 | 2/2007 | Mulligan |
| 7,199,911 B2 | 4/2007 | Hudson et al. |
| 7,303,977 B2 | 12/2007 | Voronov et al. |
| RE41,924 E * | 11/2010 | Nemets .................. B23K 26/04 250/208.1 |
| 2002/0015371 A1 | 2/2002 | Arioka |
| 2005/0124140 A1 | 6/2005 | Mulligan |
| 2005/0136622 A1 | 6/2005 | Mulligan et al. |
| 2005/0221586 A1 | 10/2005 | Mulligan et al. |
| 2006/0088984 A1 | 4/2006 | Li et al. |
| 2006/0091125 A1 | 5/2006 | Li et al. |
| 2006/0099810 A1 | 5/2006 | Voronov et al. |
| 2006/0189091 A1 | 8/2006 | Gu |
| 2006/0249816 A1 | 11/2006 | Li et al. |
| 2008/0156780 A1 | 7/2008 | Voronov et al. |

FOREIGN PATENT DOCUMENTS

| | | |
|---|---|---|
| JP | 09198459 A | 7/1997 |
| JP | 11068004 A | 3/1999 |

OTHER PUBLICATIONS

"U.S. Appl. No. 11/618,668 , Response filed Jul. 3, 2013 to Non Final Office Action mailed Apr. 9, 2013", 7 pgs.

"U.S. Appl. No. 11/618,668 Restriction Requirement mailed Jul. 29, 2010", 8.

"U.S. Appl. No. 11/618,668, Advisory Action mailed Apr. 25, 2011", 3 pgs.

"U.S. Appl. No. 11/618,668, Final Office Action mailed Feb. 18, 2011", 7 pgs.

"U.S. Appl. No. 11/618,668, Final Office Action mailed Sep. 18, 2013", 7 pgs.

"U.S. Appl. No. 11/618,668, Non Final Office Action mailed Apr. 9, 2013", 5 pgs.

"U.S. Appl. No. 11/618,668, Response filed Jan. 6, 2011 to Non Final Office Action mailed Oct. 6, 2010", 8 pgs.

"U.S. Appl. No. 11/618,668, Response filed Apr. 18, 2011 to Final Office Action mailed Feb. 18, 2011", 8 pgs.

"U.S. Appl. No. 11/618,668, Response filed Aug. 27, 2010 to Restriction Requirement mailed Jul. 29, 2010", 6 pgs.

\* cited by examiner

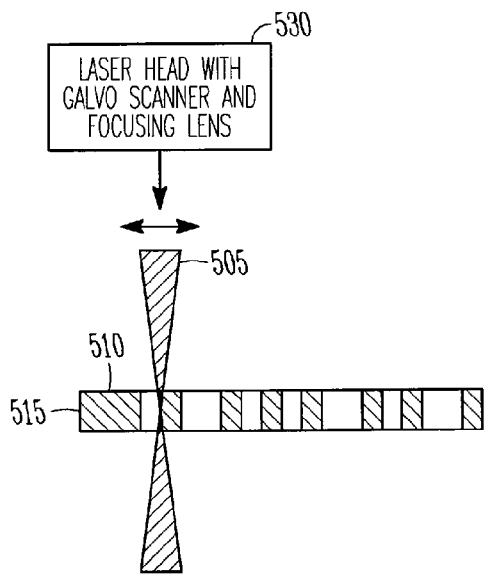
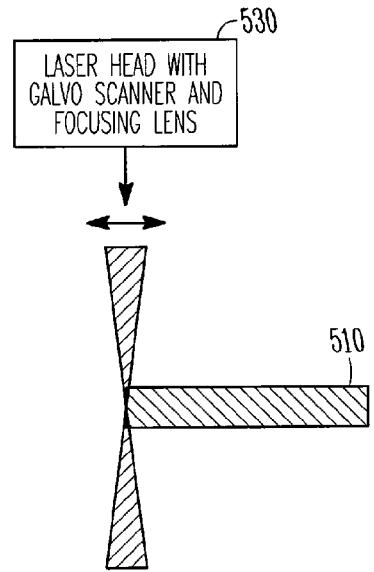
FIG. 5A
FIG. 5B
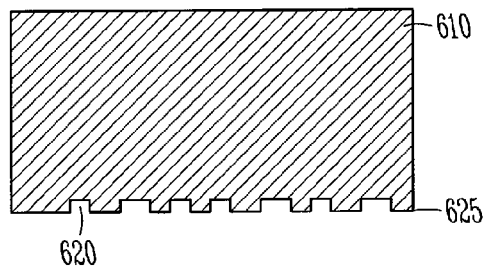
FIG. 6
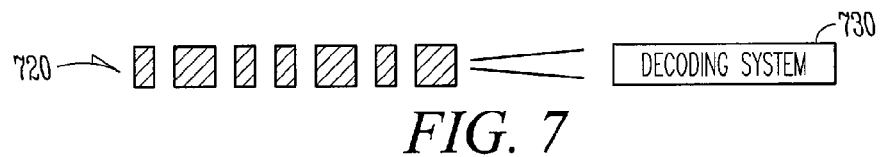
FIG. 7
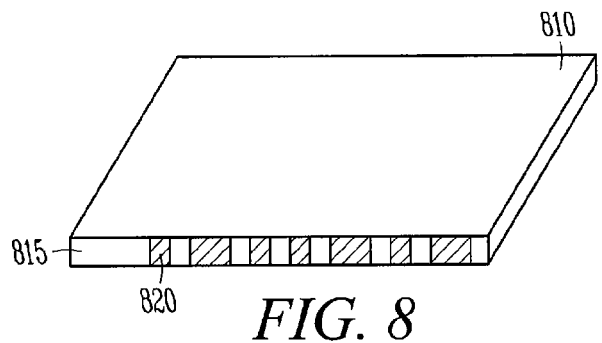
FIG. 8

SUBSTRATE MARKINGS

RELATED APPLICATION

This is a divisional of U.S. Ser. No. 11/618,668, filed Dec. 29, 2006 which is incorporated herein in its entirety.

TECHNICAL FIELD

Embodiments of the invention relate generally to processes and equipment in the assembly of electronic components, and the components assembled.

BACKGROUND

High volume production of packaged integrated circuit apparatus for the marketplace is generally based on a reliable assembly and test environment. Traceability of components during assembly may provide data to identify and evaluate portions of the assembly process. Thus, enhanced methods and apparatus to facilitate traceability of components for packaging integrated circuit apparatus during manufacture would benefit the overall manufacturing process for such apparatus.

BRIEF DESCRIPTION OF THE DRAWINGS

FIGS. 5A-5B illustrate an embodiment of an application of a system to generate informational markings on a side of a substrate.

FIG. 6 shows a view of an embodiment of the surface of a substrate in which informational markings have been generated in a side of the substrate.

FIG. 7 depicts an embodiment in which markings, generated in a side of a substrate, may be used as a bar code that may be decoded.

FIG. 8 depicts a three dimensional view of an embodiment of a substrate having informational markings generated in the side of the substrate.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the scope of the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
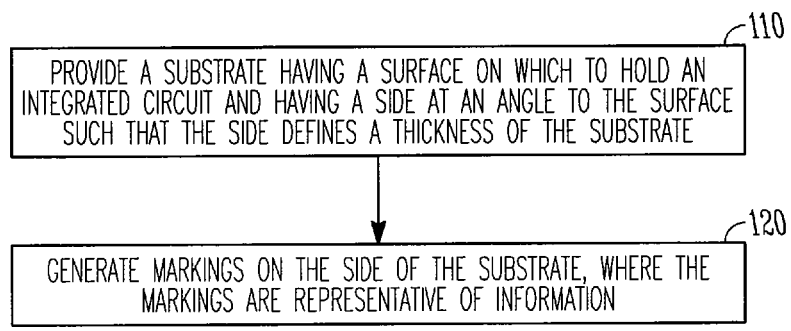
FIG. 1 illustrates features of an embodiment of a method to generate markings on the side of a substrate, where the markings are representative of information.

FIG. 1 illustrates features of an embodiment of a method to generate markings on the side of a substrate for an integrated circuit apparatus, where the markings are representative of information. At 110, a substrate is provided, where the substrate provides a mechanism to hold an integrated circuit. The integrated circuit may be located in a die. A die may have one or more integrated circuits formed within it. The substrate, on which a die is to be attached, may be characterized as a three-dimensional structure having an effective length, effective width, and effective thickness, where the effective thickness is the smallest dimension. The integrated circuit may be placed on a surface of the substrate. A side of the surface corresponding to the thickness of the substrate is at an angle to the surface of the substrate. Typically, a substrate and dies placed on the substrate have rectangular shapes. In the case of rectangular shapes, the side corresponding to the thickness of the substrate is at an angle of essentially 90° with respect to the surface of the substrate. The angle between the substrate surface and the side defining its effective thickness may vary from 90° depending on the application for mounting an integrated circuit on the surface of the substrate. The location of the substrate at which the surface terminates at the side of the substrate is the edge of the substrate surface.

At 120, markings are generated on the side of the substrate. These markings are representative of information. The markings are made as permanent grooves at the edge of the substrate surface. These permanent grooves may be made to a selected depth from the edge of the substrate into the substrate. The depth into the side of the substrate that the grooves are generated depends on the application. To maintain the surface of the substrate as contiguous as possible with respect to the state of the surface prior to generating the grooves, the depths may be maintained in the micron range. For example, 10 µm may be used as a baseline for a marking depth. The information provided by the formed grooves may be in coded form, such as a bar code. Other forms of codes may be implemented. The markings in the substrate may be constructed using a laser beam. Other mechanisms may be used to generate markings or create grooves or imprints in the side of the substrate, such as using a focused ion beam, other energy source providing a focused beam, mechanically forming notches, lithography, ink or ink-jet printing, or other type of material deposition, at the side of the substrate.

Modern electronic apparatus and systems typically include many circuits integrated into one or more common material structures. Having circuits integrated into a common piece of material generally increases both reliability and the functionality provided in the single common piece of material, which are typically small. A single piece of material may include one or more integrated circuits that may or may not be coupled together in the material. Herein, a die, relative to integrated circuits, is a piece of material on which one or more given circuits may be formed. The piece of material may be a semiconducting piece of material. The piece of material may be an insulating piece of material in which conductive material and other insulating material constructing the integrated circuits are formed. Integrated circuits are generally formed in a batch process on a wafer. The wafer is cut into many pieces after forming the integrated circuits, where each cut piece is a copy of the integrated circuit or circuits previously formed in the process. The cut piece is the die. It is not uncommon to refer to the die as an integrated circuit (IC) or a chip. A wafer is sometimes referred to as a substrate. The wafer used to form the dies may be a silicon wafer. However, depending on the application for which the dies are fabricated, the wafer may be made of other materials such as, but not limited to, gallium arsenide, germanium, a semiconductor-on-insulator, sapphire, glass, and indium phosphide. Usually, the wafer may be selected based on quality of the selected material and various properties of the selected material, which may include using single crystal materials.

The die may be packaged for application in an apparatus or system. In assembly, the die is attached to a substrate and the substrate-die component may be packaged in a protective enclosure having electrical leads to access the integrated circuit(s) in the die from outside the packaging enclosure. The substrate-die combination may be viewed as a package. The substrate may be a semiconductor substrate or a substrate of other appropriate material. The substrate has small dimensions, which may be analyzed in terms of a form factor. As system level functionality increases, the substrate-die combination may use substrates whose size is close to that of the die that is attached to the substrate, leading to an ultra small form factor (USFF). The mark provides unit traceability of the substrate and the substrate-die package during semiconductor assembly development and during transfer to high volume manufacturing. Unit level traceability (ULT) allows a given substrate to be traced through the assembly process from before attachment of a die to the substrate until the substrate-die combination package is placed into its application package and after enabled on a motherboard.

In conventional manufacturing, a 2-dimensional (2D) array is marked on a surface of the substrate, a die is attached to the substrate, the substrate with attached die is flipped and the marking is placed on the substrate or on a heat sink or top of package, which may be processed at a different assembly station than the die attach. In such a process, there is a time gap between the traceability of the substrate and the traceability of the die. During this time, there may be no unit level traceability. Further, the small form-factor of the substrate may be a space limited factor, making it difficult to use a 2D marking array on the top surface of the substrate to which the die is to be attached. Therefore in conventional 2-D approaches, on units having USFF, there may be no unit level traceability. With no ULT on USFF units, there may be an absence of passive data collection (PDC), where PDC would normally provide performance data during die attach and at other assembly and test modules. In an embodiment, a 1-dimensional approach to marking a substrate may be applied.

In an embodiment, markings are made on an area located on the edge of a substrate. The markings may be made by a focused laser beam. The focused laser beam may be directed towards a plane of the surface of the substrate. The orientation of the focused laser beam may be directed essentially orthogonally to the substrate, though the marking area is located on the edge of the substrate. Other orientations of the focused laser beam may be used depending on the geometrical configuration of the substrate. The substrate edge may be placed at a working distance such that it is located within a depth of focus (DOF) of the laser beam. The laser beam may be directed in various manners including using galvo scanners. A galvo scanner is a device that moves a light beam before a focusing lens, providing controlled positioning of the beam after the focusing lens device. A galvo scanner may include two mirrors placed on sensitive electro-magnets. A laser marking tool may be programmed to scan the laser beam back and forth into the substrate and to scan the laser beam left and right along the side of the substrate in a cycloid fashion to make permanent grooves on the side of the substrate. The process may provide permanent burned grooves. The permanent burned grooves may be edge-teeth type of burned marks across the edge length. The permanent grooves on the substrate edge may be generated to be viewed as a 1-dimensional (1D) sequence of narrow and wide grooves. Such a sequence may form a code that represents information. The information may provide a unique identification to the substrate. The code may be a bar code. Such a coded sequence may be read using conventional bar code reader or 2D reader picking up 1D information from the substrate edge. With the sequence of grooves formed at the edge of the substrate surface, the sequence of grooves may be read with a reader directed from above the top surface or below the bottom surface or from the side. Alternatively, the sequence of grooves may be read from along the side of the substrate at which the grooves were formed. Markings provided in such a manner may enhance USFF package unit level traceability without dealing with substrate space concerns and die yield concerns, if a mark is placed on a die.

Figure 2:
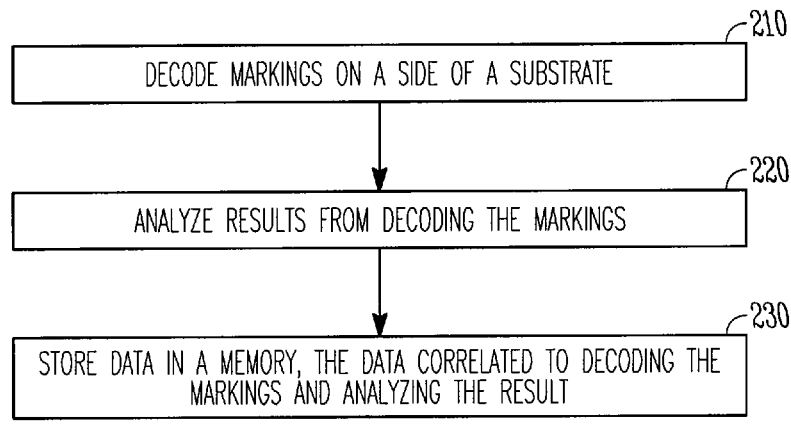
FIG. 2 illustrates features of an embodiment of a method to decode markings on a side of a substrate, where the markings are representative of information, and to analyze results from decoding the markings.

FIG. 2 illustrates features of an embodiment of a method to decode markings on a side of a substrate, where the markings are representative of information. The results from decoding the markings may be further analyzed. At 210, markings on a side of a substrate are decoded. The decoding may be performed by viewing edge-teeth on the surface of the substrate. The decoding may be performed by viewing a pattern of grooves on the side of the substrate. The markings on the side of the substrate may be generated, in accordance with an embodiment, following any prescribed manner that may encode information in 1D markings. The markings on the side of the substrate or the edge of the substrate may be generated as a bar code. The selected bar code may be read by a standard bar-code scanner, such as a laser bar-code scanner. The selected bar code may be generated to be read by a proprietary bar-code scanner. The markings may be decoded using a 2D CCD (charge coupled device) camera, which is conventionally aimed to the area of a 2D array marked on top of the substrate, to take and analyze a 1D code image of the markings on the edge of the substrate surface. The various embodiments for generating the markings are generally not limited by the 1D code that provides the information related to the substrate. The selection of a code to be used in the side of the substrate or surface edge of the substrate may generally be independent of the marking process, except that the code assigned to the substrate may be used in control circuitry to direct the markings of the given sequence associated with the application of the selected code to the substrate.

At 220, the results from decoding the markings may be analyzed. After an image or a projection of the markings on the side of the substrate is obtained, it may be decoded to determine the information represented by the markings. The information may uniquely identify the substrate. Information other than identification may be provided in the markings. A bar-code reader may decode the information embedded in the 1D marked array on the side of the substrate. An image from a CCD camera may be digitally analyzed to decode the code. The digital analysis of the retrieved encoded information may be performed on a computer.

At 230, data, correlated to decoding the markings and/or analyzing the results from decoding the markings, may be stored in a memory. The storage in a memory may be a temporary storage of data as the markings are read and decoded. The storage in a memory may be a temporary storage of data as the markings are read, decoded, and provided to a display. The display may be a screen on which the code or information from the code is presented. The display may be a print medium on which the code or information from the code is printed. Data may be stored in the memory to be used at various times. Data stored in the memory may include traceability data associated with substrate from the time that markings are generated in the side or surface edge of the substrate until it is packaged at the end of the assembly process.

Figure 3A:
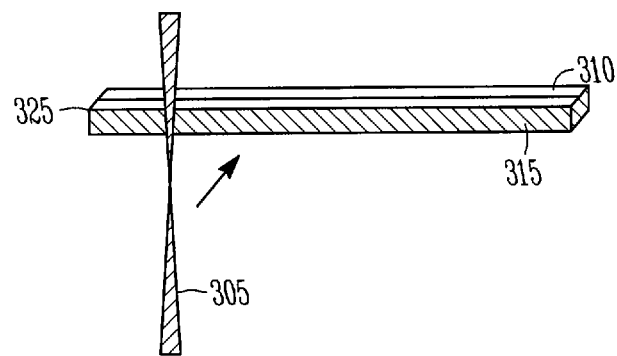
FIGS. 3A-3C depict an embodiment of a laser beam relative to a substrate to generate a marking in the side of the substrate.
Figure 3B:
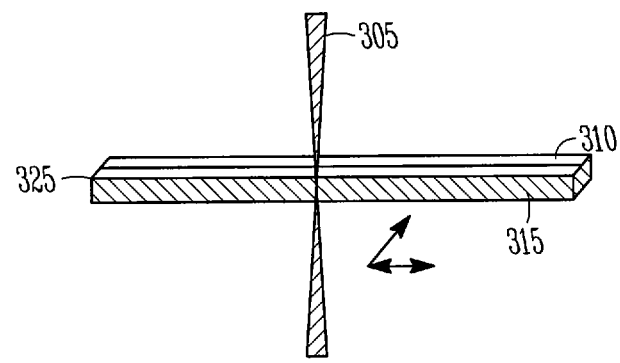
Figure 3C:
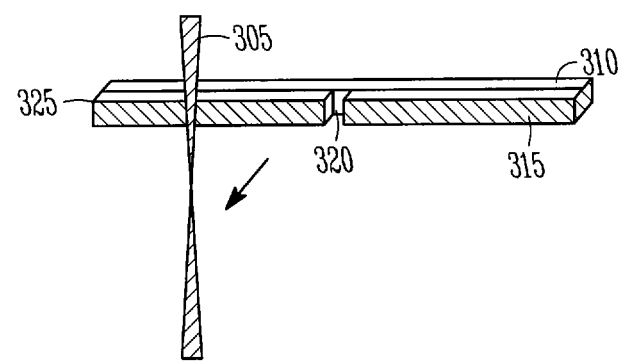

FIGS. 3A-3C depict an embodiment of a laser beam 305 relative to a substrate 310 to generate a marking 320 in a side 315 of substrate 310 having a surface edge 325. FIG. 3A shows laser beam 305 being moved towards substrate 310. A laser source of any wavelength between 10.6 μm and 266 nm may be used to provide the laser beam. Any laser making tool, controlled in accordance with an embodiment, may be used to form laser markings on side 315 of substrate 310. In various embodiments, lasers generating a laser beam having other wavelengths may be implemented such that the laser system provides a depth of focus of the focused beam that is long enough to span the whole substrate thickness.

FIG. 3B shows laser beam 305 being moved into substrate 310 from side 315 and back and forth along the length of side 315. Laser beam 305 may be scanned back and forth and left and right in a cycloid fashion to make a permanent groove on side 315 of substrate 310. The groove may be burned into side 315. Depending on the application, laser beam 305 may be altered from the essentially orthogonal orientation to substrate 310 shown in FIG. 3B.

FIG. 3C shows laser beam 305 being moved away from substrate 310 after having created marking 320 in side 315 of substrate 310. Marking 320 may have a substantially uniform width along the length of side 315 from edge 325 at the top of substrate 310 to the bottom of substrate 310. After forming marking 320 and moving laser beam 305 away from substrate 310, laser beam 305 may be moved along a portion of the length of side 315 and back into substrate 310 to make another mark. The new mark may also be formed to have a substantially uniform width along the length of side 315 from edge 325 at the top of substrate 310 to the bottom of substrate 310. This uniform width may differ from that of marking 320, according to the code being used to generate the markings as information. In addition, the distance between markings may also depend on the code being used to generate the markings as information. Alternatively, the width of each marking may vary from edge 325 at the top of substrate 310 to the bottom of substrate 310. The variation of the width within a marking may be used to modulate the 1D sequence. Such a modulation may be used to provide more information.

Figure 4:
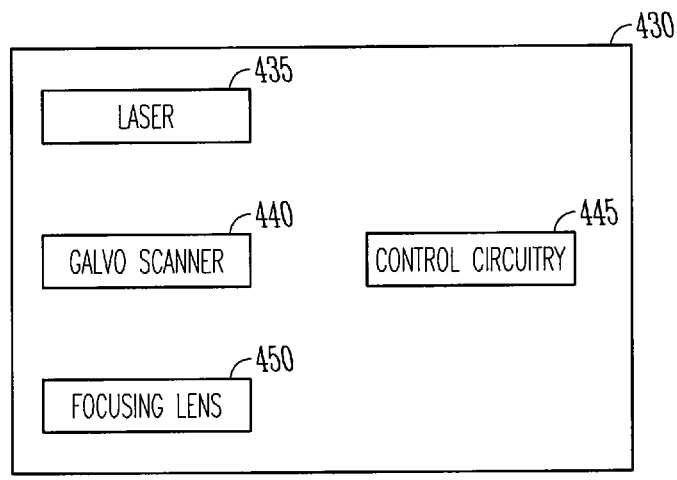
FIG. 4 depicts a block diagram of features of a system to construct markings in the side of a substrate, where the markings are representative of information.
Figure 4:
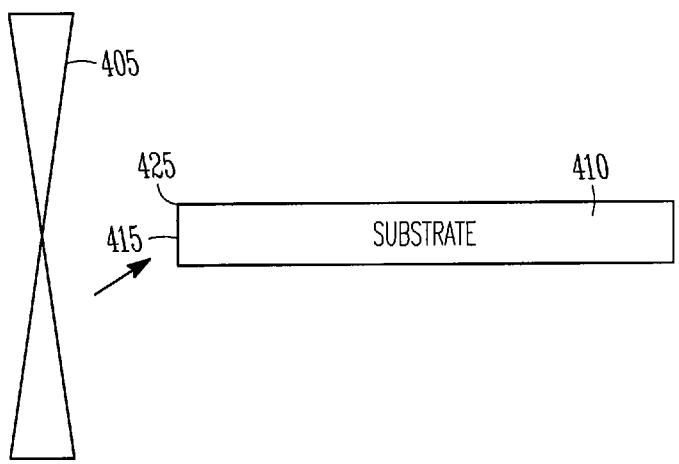

FIG. 4 illustrates a block diagram of features of an embodiment of a system 430 to generate informational markings on a side 415 of a substrate 410. System 430 may include a laser 435 and a galvo scanner 440. System 430 may include a focusing lens 450. Movement of a laser beam 405 relative to substrate 410 may be conducted using galvo scanner 440 under the control of control circuitry 445. Any laser that may be controlled by control circuitry 445 and can remove a portion of material from along a side of a substrate may be used. Such lasers may include, but are not limited to, a $CO_2$ laser, a Nd:YAG laser, and a "Green" Nd:YAG laser (wavelength of 532 nm). Control circuitry 445 may be used to control the contact of laser beam 405 to substrate 410 to generate a marking in side 415 (thickness) of substrate 410. The laser marking may begin at edge 425 of the surface of substrate 410. Substrate 410 with its identification marked in its side 415 may have a die attached to it, and substrate 410 with its attached die may be packaged with electrical leads for use in an electronic apparatus or electronic system.

Various embodiments or combinations of embodiments for apparatus and methods for forming markings in the side of a substrate, where the marking are representative of information, may be realized in hardware implementations and combinations of hardware and software implementations. These implementations may include a machine-readable medium having machine-executable instructions for performing an embodiment for forming informational markings in the side of a substrate. The instructions may direct the machine to move a laser beam to the side of the substrate, move the laser beam back and forth along a length of the side of the substrate and into the substrate a specific distance from the side of the substrate, move the laser beam away from the substrate after forming a mark in the side of the substrate, and move the laser beam along the length of the side to a location to form another mark in the side of the substrate. The instructions may include instructions to construct each marking to have its own width along the side of the substrate to form a sequence of markings along the side of the substrate in which the sequence of the individual widths may form a code representative of information. The code may be a bar code. The code may be a 1D code other than a bar code. The code may be a 1D code with modulations in the widths of the markings in the direction from the top to the bottom of the substrate or modulations in the widths of the markings in the direction from the bottom to the top of the substrate. The machine-readable medium is not limited to any one type of medium. The machine-readable medium may include a computer-readable medium. The machine-readable medium used will depend on the application using an embodiment of the coding scheme in the side of the substrate.

FIGS. 5A-5B illustrate an embodiment of an application of a system 530 to generate informational markings on a side 515 of a substrate 510. System 530 may be a system similar to that of FIG. 4 and may include control circuitry that is not shown for this discussion. A substrate 510 on which a die is to be attached is provided as a sample to which system 530 is to operate. The sample is placed within the depth of focus of the focused laser beam 505. Any marking tool that can be controlled to form the markings on side 515 of sample 510 may used. Such marking tools include, but are not limited to, a $CO_2$ (10.6 μm) tool, a Nd:YAG (1064 nm) tool , and a "Green" Nd:YAG (532 nm) tool. In an embodiment, a Green laser marker tool has a depth of focus with a +/−1.3 mm total range. This green laser marker tool may be applied to a substrate having a thickness of ≤1.1 mm such that side 515 of substrate 510 may be uniformly marked from top to bottom, creating constant width grooves on side 515. A long DOF may allow uniform width at the top, middle, and the bottom of the mark on side 515 of substrate 510. The laser of system 530 makes permanent grooves with a defined depth into substrate 510. In an embodiment, a baseline for a marking depth may be set at about 10 μm. This marking depth may be measured from side 515 into the grove bottom into substrate 510. The laser mark along side 515 of substrate 510 protrudes into substrate 510, making a permanent groove structure along side 515. Permanent grooves can be formed on side 515 of substrate 510 using laser beam 505 with the beam's waist touching side 515, as shown in FIG. 5B, and creating a sequence of grooves of varying widths along the length of side 515. The sequence of grooves of varying widths along the length of side 515 may be constructed as a bar code.

In an embodiment, a conventional laser galvo tool may be used to make markings in side 515 of substrate 510 with substrate 510 placed with the working distance within the DOF. Orientation of the focused laser beam 505 may be directed orthogonally to substrate 510 with the marking area located on side 515 of substrate 510. Other orientations of laser beam 505 may be used depending on the application. Laser beam 505 is directed using galvo scanners. The laser marking tool of system 530 may be programmed to scan laser beam 505 back and forth and left and right in cycloid fashion to make permanent burned grooves on the edge of the substrate. In an alternative embodiment, laser beam 505 is fixed and substrate 510 is moved in contact with the laser beam 505 to construct markings in side 515 of substrate 510. Using a laser source, or other energy source, lithography, or mechanical way to create the grooves having appropriate characteristics and control, markings may be formed in a side of a die.

FIG. 6 shows a view of an embodiment of the surface of a substrate 610 in which information markings 620 have been generated in a side of the substrate. In viewing the surface along an edge 625 at which the surface of substrate 610 terminates, edge-teeth type of burned marks across the edge length, formed by marking substrate 610 in accordance with one or more embodiments discussed herein, are displayed. In an embodiment, the laser light may be directed perpendicular to substrate 610 to form a pattern at edge 625 at which the surface of substrate 610 terminates. Moving along edge 625, a 1-dimensional pattern can be viewed. This 1-dimensional pattern may include edge-teeth of varying width to provide a code with embedded information in substrate 610, which may be used for unit level traceability. Then, instead of marking a 2-dimensional (2D) array for unit level traceability using laser direct marking process on a semiconductor substrate or die, this 1-dimensional sequence may be used. Application of such a 1-dimensional sequence may be applied where the small form-factor of the substrate is a space limited factor.

FIG. 7 depicts an embodiment in which markings, generated in a side of a substrate, may be used as a bar code 720 that may be decoded. The markings in the side of the substrate (such as side 515 of substrate 510 of FIG. 5A) may be permanent burned grooves on the substrate side that form a 1-dimensional bar code consisting of narrow and wide grooves. Bar code 720 may be read and decoded using decoding system 730. Decoding system 730 reads the bar code along a side of a substrate. The bar code may be read by a standard bar code reader. Alternatively, the markings may be viewed with respect to the surface of the substrate rather than the side of the substrate. A 2D reader picking up 1D information from the substrate edge may be used. Decoding system 730 may be a reader based on CCD cameras aimed at an area of the surface of the substrate that includes the edge of the terminating surface. The image from a CCD camera may be digitally analyzed on a computer and a code may be decoded. In an embodiment, a 2D CCD camera may be used to take and analyze a 1D code image.

FIG. 8 depicts a three-dimensional view of an embodiment of a substrate 810 having informational markings 820 generated in a side 815 of substrate 810. Each marking 820 may be uniform in width from the top surface of substrate 810 to the bottom surface of substrate 810. Each marking 820 may be uniform in width for a portion of the region from the top surface of substrate 810 to the bottom surface of substrate 810. Each marking 820 may be formed having a width modulated for all or a portion of the region from the top surface of substrate 810 to the bottom surface of substrate 810 with a section of the region in each marking being used to form a sequence to define a 1D code.

Figure 9:
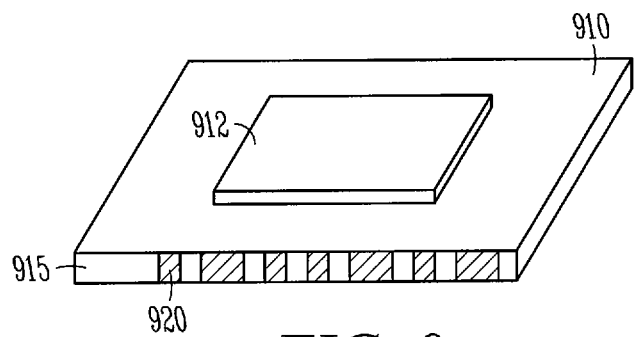
FIG. 9 illustrates an embodiment of an apparatus having a substrate with informational markings generated in the side of the substrate.

FIG. 9 illustrates an embodiment of an apparatus having a substrate 910 with informational markings 920 generated in a side 915 of substrate 910. FIG. 9 shows substrate 910 with a die 912 attached to substrate 910. The characteristics and formation of markings 920 may be generated in accordance with embodiments discussed herein. Markings 920 provide for traceability of the substrate 910—die 912 combination in assembly processing following attachment of die 912 to substrate 910.

Figure 10:
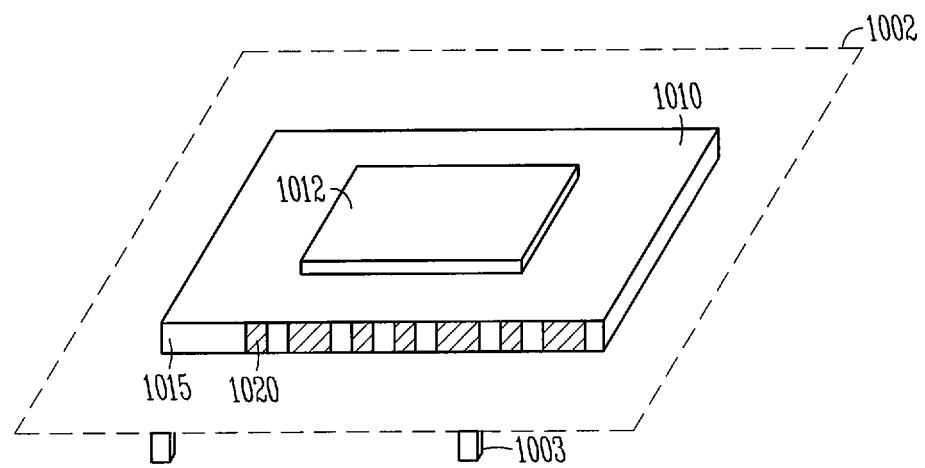
FIG. 10 illustrates an embodiment of an apparatus having a substrate with informational markings generated in the side of the substrate.

FIG. 10 illustrates an embodiment of an apparatus having a substrate 1010 with informational markings 1020 generated in a side 1015 of substrate 1010. FIG. 10 shows substrate 1010 with a die 1012 attached to substrate 1010, in which the substrate 1010—die 1012 combination is encapsulated in housing 1002 having electrical leads 1003. Electrical leads 1003 provide for electrical communication of one or more integrated circuits formed in die 1012 with other electrical components in an electronic apparatus or electronic system in which housing 1002 may be located.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   providing a substrate, the substrate having a surface on which to hold an integrated circuit, the substrate having a side at an angle to the surface such that the side defines a thickness of the substrate; and
   generating markings on the side of the substrate, the markings being representative of information.

2. The method of claim 1, wherein generating markings on the side of the substrate includes marking the side of the substrate using a laser beam.

3. The method of claim 2, wherein the method includes placing an edge of the substrate within a depth of focus of the laser beam, the edge being an edge of the surface relative to the side of the substrate.

4. The method of claim 3, wherein the method includes scanning the laser beam to make permanent grooves on the edge of the substrate.

5. The method of claim 4, wherein scanning the laser beam to make permanent grooves on the edge of the substrate includes making grooves with 10 µm as a marking depth baseline.

6. The method of claim 2, wherein the method includes directing the laser using galvo scanners.

7. The method of claim 1, wherein generating markings on the side of the substrate includes forming permanent grooves in the side of the substrate as a bar code.

8. The method of claim 1, wherein generating markings on the side of the substrate includes generating markings on the side of a substrate on which to attach a die containing the integrated circuit.

9. The method of claim 1, wherein generating markings on the side of the substrate includes mechanically forming notches, using lithography, using ink printing, using ink-jet printing, depositing material at the side of the substrate, using a focused ion beam, or using an energy source providing a focused beam, the energy source being different from an ion beam.

10. A method including:
  decoding markings on a side of a substrate, the substrate having a surface on which to hold an integrated circuit, the side of the substrate being at an angle to the surface such that the side defines a thickness of the substrate, the markings being representative of information;
  analyzing results from decoding the markings; and
  storing data in a memory, the data correlated to decoding the markings and/or analyzing the results.

11. The method of claim 10, wherein decoding markings on a side of a substrate includes using a bar-code scanner to read the markings and decode the information.

12. The method of claim 10, wherein decoding markings on a side of a substrate includes using a two-dimensional CCD camera to image the markings.

13. The method of claim 10, wherein the method includes decoding markings at various times during assembly of an electronic product to collect data throughout an assembly line process.

14. The method of claim 10, wherein analyzing results from decoding the markings includes generating reliability data.

15. The method of claim 10, wherein analyzing results from decoding the markings includes generating traceability data regarding the substrate and displaying the data on a display medium.

16. A system comprising:
  a laser to generate a laser beam;
  a galvo scanner to scan the laser beam along a side of a substrate, the substrate having a surface on which to hold an integrated circuit, the side of the substrate being a side at an angle to the surface such that the side defines a thickness of the substrate; and
  control circuitry to regulate the galvo scanner to generate markings on the side of the substrate, the markings representative of information.

17. The system of claim 16, wherein the control circuitry includes circuitry to regulate the galvo scanner to move the laser beam along an edge of the substrate, the edge being an edge of the surface relative to the side of the substrate.

18. The system of claim 16, wherein the control circuitry includes circuitry to regulate the galvo scanner to move the laser beam into the substrate at an edge of the substrate, the edge being an edge of the surface relative to the side of the substrate.

19. The system of claim 16, wherein the control circuitry includes circuitry to generate markings on the side of the substrate as a bar code.

* * * * *